United States Patent [19]

Hubele et al.

[11] Patent Number: 4,730,601

[45] Date of Patent: Mar. 15, 1988

[54] STEAM ENGINE REACTION CHAMBER, FUEL COMPOSITION THEREFORE, AND METHOD OF MAKING AND OPERATING SAME

[75] Inventors: Norman D. Hubele; Kim L. Johnson, both of Phoenix, Ariz.

[73] Assignee: The Garrett Corporation, Los Angeles, Calif.

[21] Appl. No.: 919,281

[22] Filed: Oct. 15, 1986

Related U.S. Application Data

[62] Division of Ser. No. 681,160, Dec. 13, 1984, Pat. No. 4,643,166.

[51] Int. Cl.$^4$ ............... F24J 1/00; F24J 3/00
[52] U.S. Cl. ................... 126/263; 60/251; 60/253
[58] Field of Search ........... 60/252, 253, 256, 219, 60/211, 251, 200.1; 126/263; 114/337; 122/21

[56] References Cited

U.S. PATENT DOCUMENTS

| | | |
|---|---|---|
| 1,532,930 | 4/1925 | O'Neill . |
| 2,968,917 | 1/1961 | Whaley . |
| 2,971,325 | 2/1961 | Gongwer . |
| 3,048,966 | 8/1962 | Feraud et al. . |
| 3,049,872 | 8/1962 | Johnson et al. . |
| 3,101,592 | 8/1963 | Robertson et al. . |
| 3,149,458 | 9/1964 | Harris . |
| 3,153,902 | 10/1964 | Morrell . |
| 3,153,903 | 10/1964 | Morrell . |
| 3,158,993 | 12/1964 | Hodgson . |
| 3,158,994 | 12/1964 | Hodgson . |
| 3,325,318 | 6/1967 | Pauliukonis . |
| 3,357,186 | 12/1967 | Multer . |
| 3,398,536 | 8/1968 | Stolins, Jr. ............... 60/253 |
| 3,486,332 | 12/1969 | Robertson et al. . |
| 3,525,223 | 8/1970 | Radebold et al. . |
| 3,771,313 | 11/1973 | Kaiho . |
| 3,779,011 | 12/1973 | Verdier ............... 60/251 |
| 3,782,112 | 1/1974 | Muzzy ............... 60/251 |
| 3,964,416 | 6/1976 | Kiraly et al. . |
| 4,118,930 | 10/1978 | Jacobson et al. ............... 60/253 X |
| 4,406,863 | 9/1983 | Jenkins ............... 60/251 X |

*Primary Examiner*—Larry Jones
*Attorney, Agent, or Firm*—Terry L. Miller; James W. McFarland

[57] ABSTRACT

A fuel composition for a reaction chamber which when combined with a selected reactant produces heat energy and hydrogen gas. A reaction chamber structure, method of making and method of operating the reaction chamber are also disclosed.

13 Claims, 3 Drawing Figures

STEAM ENGINE REACTION CHAMBER, FUEL COMPOSITION THEREFORE, AND METHOD OF MAKING AND OPERATING SAME

This is a division of application Ser. No. 681,160, filed Dec. 13, 1984, now U.S. Pat. No. 4,643,166, issued Feb. 17, 1987.

BACKGROUND OF THE INVENTION

The field of the present invention is Rankine cycle vapor pressure or steam engines obtaining their driving heat energy from a chemical reaction other than the usual combustion of fuel with oxygen from the air. Particularly, the theoretical possibility of utilizing the reaction energy of a reactive metal fuel such as Aluminum, Magnesium, or Lithium, and alloys or hydrides of these and similar reactants, with an "oxidizer" such as hydrogen peroxide, Freons, sulfur hexaflouride, water, and others, has been recognized for many years. However, the technical difficulties and conflicts standing between a theoretical construction of such a power system and a practical apparatus which is functional outside of the laboratory are legion.

By way of example, many of the fuel-reactant combinations proposed in the past require that the fuel be raised above ordinary ambient temperatures in order to permit reaction with the reactant. Such a heating requirement necessitates that some heating means, such as electrical heating coils or pyrotechnic chemicals be provided. In the former case, a significant start-up delay is incurred while a portion or all of the fuel is raised to reaction temperature. In the latter case, the pyrotechnic chemicals, which are or may be considered to be low velocity explosives, present the possibility of rupturing the reaction chamber and escape of highly reactive or toxic fuels. Such pyrotechnic heating chemicals also frequently produce a quantity of gaseous reaction products which must be contained within the reaction chamber, or else vented therefrom while preventing loss of fuel.

Another undesirable aspect of many previously proposed fuel-reactant systems is that intermediate reaction products or end reaction products are formed which on the one hand inhibit further progress of the reaction between the fuel and reactant, or on the other hand freeze at a temperature higher than the desired reaction chamber temperature. In the one case, complex structures and methods have been proposed to cure the shortcoming by removing the intermediate or final reaction product from the reaction chamber. Alternatively, only a portion of the fuel could be brought into contact with the reactant so that reaction products could not contaminate the remaining fuel. Again, complexity is increased.

The problem of the reaction intermediates or final products freezing at too high a temperature presents the difficulty that the reaction chamber may soon become filled with a "slush" of frozen reaction products in a slurry of molten fuel. Similarly, the high-freezing constituents present in the reaction chamber may form a "frost" or crust on the coolest surfaces present. These cool surfaces will ordinarily be heat transfer surfaces where it is desired to transfer heat from the chemical reaction for utilization in a steam or vapor pressure Rankine cycle engine. Such a crust on the heat transfer surfaces will ordinarily have a relatively high insulation value in comparison with the molten fuel. As a result, the crusted reaction products themselves progressively inhibit heat transfer from the reaction chamber to the engine.

A novel approach to the above-discussed problem is presented by the copending patent application Ser. No. 681,160, now U.S. Pat. No. 4,643,166, issued Feb. 17, 1987, of Palmer Wood, having the same filing date and assignee as this application (hereinafter the Wood application). In the Wood application a fuel is reacted with water in the absence of oxygen to produce heat and hydrogen. The heat from this reaction is used to produce water steam. The hydrogen is burned with oxygen in a separate second reaction chamber to produce super heated steam. The steam from the first reaction chamber is used as a coolant and diluent in the second reaction chamber so that steam flowing from the second reaction chamber to a turbine, or other expander, has a metalurgically acceptable temperature. The disclosure of the Wood application is hereby incorporated herein by reference to the extent necessary for a complete understanding of the present invention.

A shortcoming of the invention of the Wood application discovered by the present inventors is that a hydrogen bearing reaction intermediate is formed which initially partially prevents the evolution of the hydrogen from the first reaction chamber. As the reaction progresses, the reaction intermediate further reacts to release the bound hydrogen. The result is that over the period of the reaction, the rate of hydrogen production is at first relatively low, reaches a stable plateau, and then raises above the plateau as the fuel supply is consumed.

A consequence of this nonuniform rate of hydrogen production is that the power output of the Rankine cycle steam engine is relatively low initially and cannot be increased until the hydrogen production rate of the chemical reaction chamber increases. Understandably, this sluggish initial power output of such a system is undesirable in almost every prospective application. Additionally, the nonuniform rate of hydrogen production creates many difficulties in controlling the power output level of the Rankine cycle engine.

Conventional reaction chambers, fuel-reactant combination's, and methods of operating engines of the above-defined character are presented in United States patents:

SUMMARY OF THE INVENTION

In view of the above discussion it is an object of the present invention to provide a reaction chamber fuel composition reactive with water to produce hydrogen at a substantially uniform rate during the life of the fuel supply. Another object of this invention is to provide such a reaction chamber fuel composition which is reactive with water at common ambient temperatures, and which does not require preheating or pyrotechnic chemicals, for example, to be used in starting the reaction.

Another object of the present invention is to provide a reaction chamber structure for use with the inventive present fuel composition, and other fuel compositions of a similar nature.

Still another object of the present invention is to provide a method of making a reaction chamber according to the present invention;

Yet another object of the present invention is to provide a method of operating a reaction chamber according to the present invention.

The present invention according to one aspect provides a two-part fuel composition including a first or main fuel part of magnesium and aluminum in a molar ratio of 1:2, respectively. The second or starter fuel part is composed of lithium hydride, magnesium, and aluminum in equal molar ratio. On a weight basis, the starting fuel composition and main fuel composition are presented at a ratio of about 1:4.

In a reaction chamber according to the present invention, the above-outlined fuel is present in the form of prealloyed powders produced, for example, from condensed vaporized or atomized metal. The reaction chamber structure provides in addition to heat transfer means, a means for introducing water into the chamber for reaction with the fuel.

According to one aspect of the invention, the means for introducing water comprises a manifold with foraminous distribution tubes depending in the fuel. The distribution tubes are immediately surrounded by a comparatively thin layer of the starting fuel part. The main fuel part is received within the reaction chamber around the distribution tubes and layer of starting fuel part.

According to another aspect of the invention, the main fuel part is disposed in a lower portion of the reaction chamber. In an upper portion of the reaction chamber is disposed an appropriate quantity of the starting fuel part. The reaction chamber includes a water inlet nozzle disposed in an upper part of the reaction chamber above both the starting and main fuel parts. Preferrably, the water nozzle is separated from the fuel during operation of the reaction chamber and engine.

In accord with yet another aspect of the invention, a method of operating a reaction chamber of the descibed character includes reacting water with a hydride of a reacting fuel element to form a hydroxide of the fuel element which hydroxide is further reactive with a first mixture of fuel elements being rather less reactive than the hydride of the first fuel element. The heat liberated from the above described reaction is employed to raise the temperature of the less reactive fuel elements to a level where they are vigorously reactive with the present hydroxide and with water.

Still another aspect of the present invention involves the method of making a reaction chamber according to the invention and including the steps of providing means for introducing water into the reaction chamber, disposing a selected quantity of the first starting fuel part in proximity with said water introducing means to be first contacted by water introduced therethrough, and filling the remainder of the reaction chamber, or a selected portion thereof, with the second main fuel part.

The advantages offered by the present invention include the absence of any need or requirement to provide fuel preheating before the reaction chamber is operational. Further, the introduction of simple water is all that is required to initiate operation of the reaction chamber to produce both heat and a supply of hydrogen. This latter feature is of particular advantage when the invention is used in connection with a water bourne vehicle. Understandably, a quantity of the available water may be used in the Rankine cycle steam engine, eliminating entirely the need to store water aboard the vehicle for such use.

Further to the above, the rate of heat and hydrogen, production may be moderated during the life of the available fuel supply by controlling the rate of water supply to the reaction chamber so that the Rankine cycle engine may be throttled. Additionally, the rate of hydrogen production during the use of the fuel supply is substantially uniform in proportion to moderation of the reaction rate with the rate of water supply. The reaction intermediates and final reaction products do not seriously interfere with heat transfer out of the reaction chamber.

Still further, the applicants have discovered that the present invention virtually eliminates anticipated difficulties with separating the evolved hydrogen from the reaction products and fuel. Such separation is essential to prevent fuel and reaction products being carried into and damaging the steam expander of the Rankine cycle engine. Surprisingly, the fuel composition and reaction chamber of the present invention allows a very simple filter structure to be interposed between the fuel and the hydrogen outlet from the reaction chamber. An unexpected phenomenon described herein below results in a simple filter accomplishing almost perfect filtering of the evolved hydrogen.

BRIEF DESCRIPTION OF THE DRAWINGS FIGURES

FIG. 1 schematically depicts a reaction chamber according to the present invention, and having a two-part fuel composition disposed therein;

FIG. 2 schematically depicts an alternative embodiment of a reaction chamber according to the invention; and FIG. 3 graphically depicts and compares the rates of hydrogen production of reactions according to the Wood application, and in accordance with the present invention.

DETAILED DESCRIPTION OF THE PREFERRED EMBODIMENTS

Figure 1:
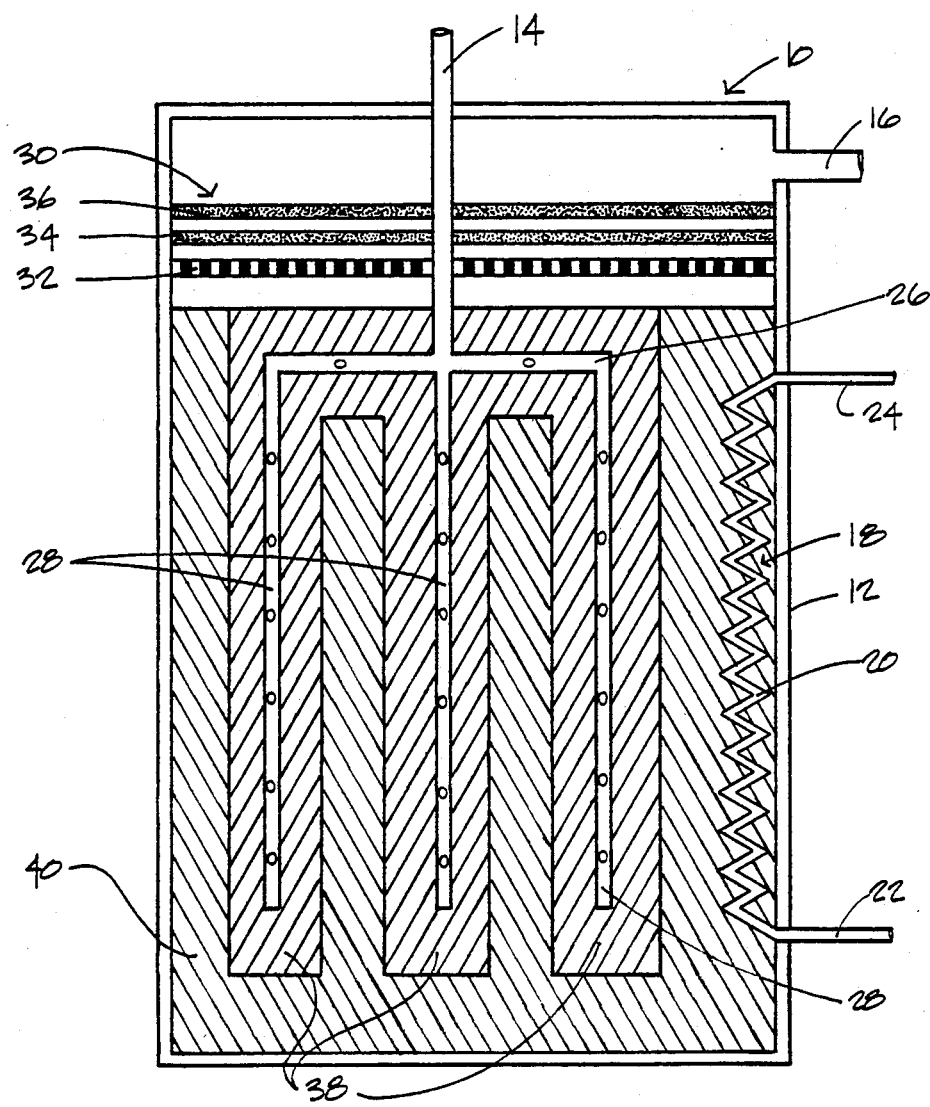

With reference to FIG. 1, a preferred embodiment of the inventive reaction chamber 10 is depicted. The reaction chamber 10 includes a vessel 12 defining a reaction water inlet 14 and a hydrogen outlet 16. Additionally, the vessel 12 includes structure 18 for transfering heat from the interior of vessel 12 to a Rankine cycle or other heat engine (not illustrated). The heat transfer structure is depicted as a boiler tube 20 passing into the vessel 12 at 22 to define a water inlet, and passing out of the vessel at 24 to define a steam outlet.

Within the vessel 12, the reaction water inlet 14 communicates with a manifold 26 having a plurality of foraminous water distribution tubes 28 depending therefrom. Also disposed within the vessel 12 in surrounding relation with the inlet 14 is a hydrogen filter structure generally referenced with the numeral 30. The hydrogen filter 30 preferrably includes a lower perforate plate 32, and a pair of felt-metal pads 34,36 disposed above the plate 32.

Also disposed within the vessel 12 in surrounding relation with the perforate distribution tubes 28 is a selected quantity of a first or starting fuel part 38. The starting fuel 38 is disposed within the reaction chamber 10 somewhat in the form of a coating upon or around the tubes 28. Similarly, around the starting fuel 38 is disposed a certain quantity of a second or main fuel part 40. The main fuel 40 fills substantially all of the remaining volume of the vessel 12 and is in surrounding relation or otherwise in heat transfer relation with the structure 18.

One example of a fuel composition for use within reaction chamber 10 is composed of starting fuel part 38 having equal molal components of lithium hydride, magnesium, and aluminum. This starting fuel composition is employed with a main fuel part 40 of aluminum and magnesium in a molar ratio of 2:1. Preferably, the main fuel part 40 and starting fuel part 38 are present in a ratio of about 4:1, on a weight basis.

Figure 2:
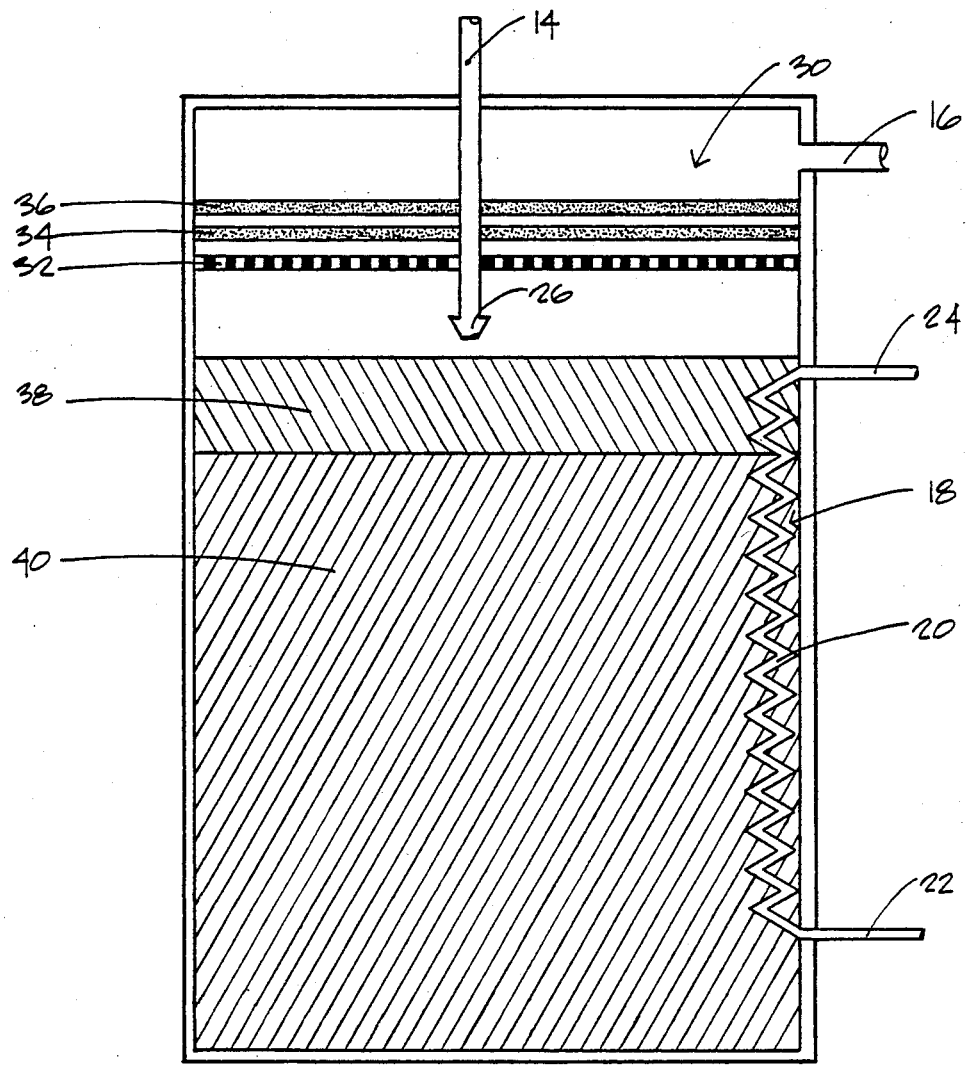

Turning now to FIG. 2, an alternative embodiment of the invention is depicted wherein reference numerals previously used and with a prime added designate similar elements. The reaction chamber 10' includes a vessel 12' with reaction water inlet 14', hydrogen outlet 16', heat transfer structure 18', and filter structure 30'. However, the main fuel part 40' is simply disposed in the lower portion of the vessel 12', with a layer of the starting fuel part 38' disposed on the main fuel part in an upper portion of the vessel 12'. A distance above the upper surface of the starting fuel part 38' is disposed an inlet nozzle 26' at the lower end of the inlet 14'. The nozzle 26' is arranged to project water received via inlet 14, downwardly upon and into the fuel 38',40' as a single penetrating stream, plurality of such streams, or penetrating mist. Importantly, the nozzle 26' is spaced sufficiently away from the fuel 38',40' that even allowing for thermal expansion of the reactants, nozzle 26' is not contacted by the molten fuel.

Having observed the structure of the two preferred embodiments of the invention, attention may now be directed to their operation. With respect to FIG. 1, when it is desired to start operation of the Rankine cycle heat engine (not shown) water is supplied to inlet 14 at a determined rate. The supplied water is distributed by manifold 26 to distribution tubes 28. The perforate distribution tubes 28 carry the supplied water into immediate contact with substantially all of the starting fuel part 38. Such is the case because, as pointed out above, the starting fuel part 38 is disposed in surrounding relation with the tubes 28 as a relatively thin layer or coating. The supplied water reacts with the starting fuel part to produce Lithium hydroxide and heat. Lithium hydroxide further reacts with the other constituents of the starting fuel part and with the main fuel part to produce hydrogen gas and additional heat. The initial heat production from the starting fuel part 38', serves both to increase the temperature and to increase the propensity to react with water of the remaining fuel. In very short order, the entire mass of fuel is raised to a sufficiently high temperature that the fuel is molten and readily reacts with water.

Figure 3:
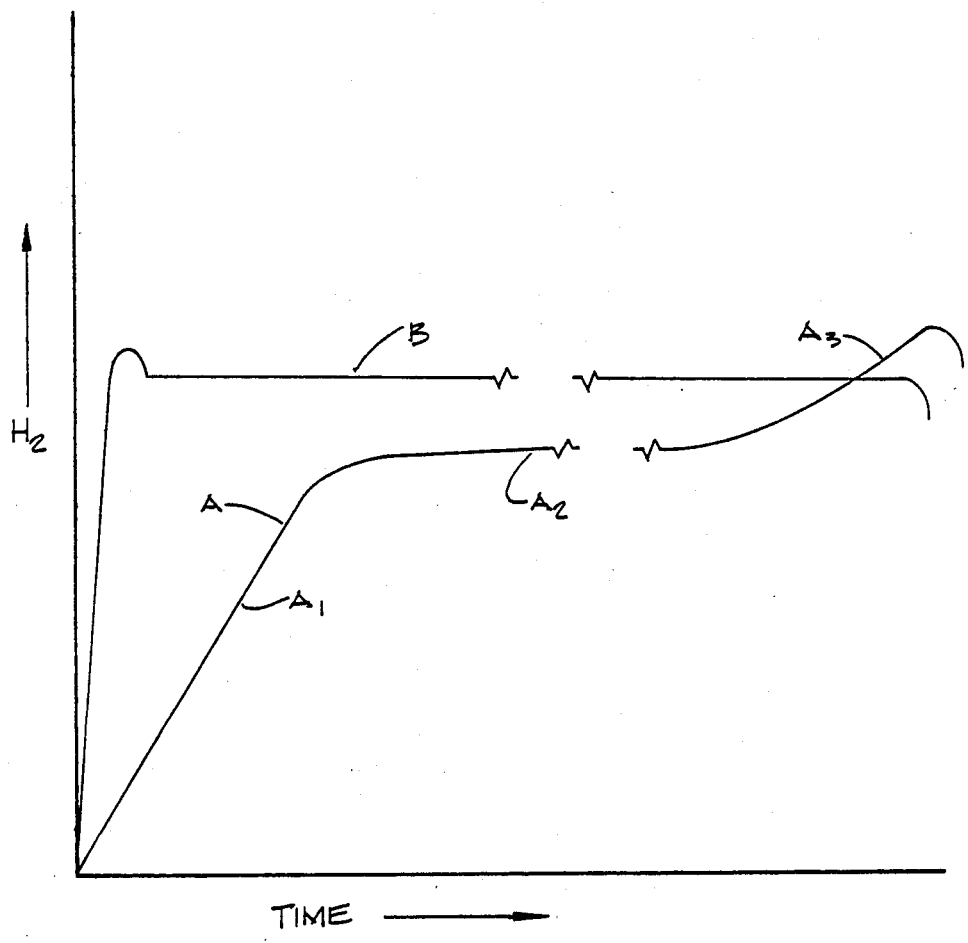

FIG. 3 graphically depicts the time rate of hydrogen production from a reaction chamber according to the invention with the passage of time from the moment of first water injection into the reaction chamber, Viewing FIG. 3, line A represents, for comparison only, the rate of hydrogen production from a reaction chamber according to the Wood application. As line A represents, a reaction chamber according to the Wood application initially produces hydrogen at a relatively low rate which increases more slowly than desired (portion $A_1$,). Following the initially slow start, the reaction chamber reaches a plateau (portion $A_2$) of relatively stable hydrogen production rate. Finally, as the fuel mass nears exhaustion, the reaction chamber according to the Wood application produces hydrogen at an increased rate (portion $A_3$), leading to a drop off at exhaustion of the service life of the reaction chamber.

In contrast, line B on FIG. 3 depicts the rate of hydrogen production from a reaction chamber according to the present invention. As line B shows, after an initial starting surge, the rate of hydrogen production is substantially uniform throughout the service life of the reaction chamber. It will be understood, of course, that FIG. 3 is representative for comparison purposes only. In fact, the actual rate of hydrogen production from a particular reaction chamber is variable dependent on many factors including the relative size of the chamber and the controlled rate of reaction water introduction thereto.

With respect to the reaction chamber of FIG. 2, it will be noted that inlet 14', and nozzle 26' direct the water supplied thereto downwardly from above onto and into the fuel 38', 40'. Of course, the upper layer of starting fuel part 38' is first contacted by the introduced reaction water, much in the same fashion as the reaction chamber of FIG. 1. However, the nozzle 26' is at all times spaced apart from and above the zone of reaction which is formed where the reaction water reacts with the fuel parts 38' and 40'. Because the nozzle 26' is not immersed in the molten fuel 38',40', there is virtually no chance of the nozzle 26' becomming plugged with fuel or reaction products. Further, because the nozzle 26' is substantially free of heat transfer from the molten fuel 38',40', high-temperature materials of construction for the nozzle are not necessary, and the nozzle may be made of relatively common, inexpensive materials.

Surprisingly, an actual test of a reaction chamber similar to that of FIG. 2 has shown that the bath of molten fuel does not, as previously assumed, require agitation from direct immersed reactant injection. In other words, the reaction is sufficiently vigorous that the stirring, mixing influence of a jet or stream of water injected from a nozzle immersed in the bath is unnecessary. Simply spraying the water upon the fuel will allow the reaction chamber to run to completion of the reaction with acceptably high utilization of the fuel mass. Specifically, the applicant's tests have shown a 95% or greater fuel utilization may be expected from a reaction chamber according to FIG. 2. The reaction chamber of FIG. 1, it is beleived, would provide a somewhat higher percentage of fuel utilization.

With both of the reaction chambers shown in FIGS. 1 and 2, the evolved hydrogen is filtered by filter structures 30 and provided via outlet 16 for utilization in the Rankine cycle engine (not shown). The fuel mixtures of the present invention are believed to offer a suprising and unexpected advantage by simplifying the required filter structure. The conflicting requirements for the filter structure 30 are that it be open to passage of hydrogen while being sufficiently closed to both fuel and reaction products that the latter are not allowed to pass downstream with the hydrogen via outlet 16. Further, the filter dare not clog. Surprisingly, the present fuel mixtures have been found to deposit reaction products on the filter 30 to a extent resulting in a self-regulating filter mechanism. An actual test of a reaction chamber 10' according to FIG. 2 employed a perforate plate 32 having apertures of 0.125" size, and comprising 60% open area of the total plate area. The felt metal pads 34, 36 were of 0.006" filament size with 95$\mu$" pore size having 60% theoretical density. During operation of the reaction chamber virtually perfect filtering of the evolved hydrogen resulted. The internal pressure of the reaction chamber was within acceptable limits, indicating that the filter 30 was not clogged or overly restrictive to passage of Hydrogen. Neither was there indication of excessive openness or porosity of the filter. Astonishingly, where the reaction chamber was disassembled for visual inspection, the filter 30, and particularly pad 34, gave the appearnce of being clogged with reaction products. The filter was not in fact clogged with respect to passage of evolved hydrogen, however, as the acceptably low internal pressure of the reaction chamber during operation indicated.

Examination of the start up fuel reaction products of a test run indicated two product phases. The primary product phase was $LiAlO_2$. The smaller secondary reaction product phase was $MgAL_2O_4 + LiAL_5O_8$. The percentages of pure fuel metals remaining were Li less than 1%, Mg less than 1%, and AL less than 1%. LiOH and MgO were both present in trace amounts.

In view of all of the above, it is seen the present invention provides novel fuel compositions for use in a reaction of the type described. Two preferred embodiments of the reaction chamber itself are presented along with methods of operating and making the reaction chambers. The invention also provides a substantially uniform rate of hydrogen evolution and allows the use of reactant injection nozzles which are optionally either immersed in or spaced above the molten bath of reactive fuel. Finally, it is seen that a significant and unexpected advantage results from the present invention in that filtering of the evolved hydrogen becomes self regulating.

The starting and main fuel part reactions with water are believed to be as follows:

STARTING FUEL REACTIONS (1) $LiH + H_2O \rightarrow LiOH + H_2 \uparrow + \dot{Q}_{HEAT}$
(2) $2LiOH + AL_2O_3 \rightarrow 2LiALO_2 + H_2O + \dot{Q}$
(3) $LiOH + H_2O + AL \rightarrow LiALO_2 + 3/2H_2 \uparrow + \dot{Q}$
(4) $Mg + H_2O \rightarrow MgO + H_2 \uparrow + \dot{Q}$

MAIN FUEL REACTIONS (1) $Mg + H_2O \rightarrow MgO + H_2 \uparrow + \dot{Q}$
(2) $4MgO + 2AL \rightleftharpoons MgAL_2O_4 + 3Mg$ While the present invention has been depicted and described with reference to multiple preferred embodiments thereof, such reference does not imply a limitation upon the invention, and none is to be inferred. The invention is intended to be limited only by the scope and spirit of the appended claims, and range of equivalents thereto, which also provide a definition and disclosure of the invention.

We claim:

1. Apparatus comprising a chambered housing defining an inlet to and an outlet from the chamber therein, a main fuel part composed essentially of metallic aluminum and metallic magnesium substantially in two-to-one molal relation, repectively, disposed in a lower portion of said chamber, a water reactive hypergolic starting fuel part disposed both in heat transfer relation with said main fuel part and in juxtaposition with said inlet, said starting fuel part being composed essentially of lithium hydride and a metallic element from the group including magnesium and aluminum, said starting fuel part including both metallic magnesium and metallic aluminum along with lithium hydride in substantially one-to-one-to-one molal relationship, said starting fuel part and said main fuel part being present in one-to-four weight relation, respectively, means in association with said inlet for receiving water flow and delivering said water flow first to said starting fuel part for hypergolic reaction therewith and then to said main fuel part, filter means in association with said outlet for allowing passage of subtantially only hydrogen gas therethrough, and heat transfer means in association with said fuel parts.

2. The method of making a reaction chamber for use in association with a heat cycle engine for supplying both heat energy and hydrogen gas thereto, said method comprising the steps of:
   providing as chambered housing defining a water inlet and a hydrogen outlet;
   disposing in said chamber main fuel part composed essentially of aluminum and magnesium in two-to-one molar relationship;
   disposing in said chamber in heat transfer relation with said main fuel part a water-reactive hypergolic starting fuel part composed essentially of lithium hydride and metallic aluminum and metallic magnesium in equal molar relationship,;
   providing said main fuel part and said starting fuel part in substantially 4:1 weight proprotion, repsectively;
   providing means in association with said water inlet for directing water received thereat first to said starting fuel part and then to said main fuel part;
   associating filter means with said outlet for allowing passage substantially only of hydrogen gas from said chamber via said outlet; and
   associating heat transfer means with said fuel.

3. The method comprising:
   (a) reacting water with a water-hypergolic mixture of lithium hydride and a metallic element from the group including aluminum and magnesium to produce lithium hydroxide, hydrogen gas and heat energy;
   (b) utilizing a portion of said heat energy to liquefy a mass of metallic fuel including aluminum;
   (c) utilizing said lithium hydroxide produced by hypergolic reaction of said water with said mixture to both react further with metallic constituents thereof and to react with said aluminum of said metallic fuel;
   (d) reacting water with said liquefied fuel mass to produce both additional hydrogen gas and additional heat energy;
   (e) providing heat transfer means in association with said fuel mass for transferring part of said heat energy and said additional heat energy to an energy utilizer; and
   (f) providing means for transferring said hydrogen gas to utilizer therefor substantially free of contamination.

4. The method of claim 3 including the step of including magnesium in said fuel mass in addition to said aluminum.

5. The method of claim 4 including providing said magnesium with said aluminum in a molar ratio of 1:2, respectively.

6. The method of claim 3 including providing both aluminum and magnesium in said mixture.

7. The method of claim 6 including providing both said aluminum and said magnesium in said mixture in substantially equal molar ratio with said lithium hydride.

8. The method of claim 7 including providing magnesium in said fuel mass in addition to said aluminum.

9. The method of claim 8 including providing said magnesium in said fuel mass in a molar ratio of 1:2 to said aluminum.

10. The method of claim 9 including providing said mixture in a weight ratio of 1:4 to said fuel mass.

11. The method of operating a hydrogen and heat producing reaction comprising a mass of main fuel composed essentially of metallic aluminum and metallic magnesium, and a lesser mass of hypergolic starting fuel composed essentially of lithium hydride and a metallic element from the group including magnesium and aluminum, comprising associating said starting fuel with said main fuel in a layered heat transfer relation with said starting fuel uppermost, and discharging water onto the upper surface of said associated fuels first for hypergolic reaction with said starting fuel and then for reaction with said main fuel.

12. The method of starting a water-fuel reaction within a vessel holding a two-part fuel comprised of a main fuel including metallic aluminum, and a hypergolic starting fuel comprised of lithium hydride and a metallic element from the group including aluminum and magnesium and disposed upon said main fuel, said method including the step of discharging water downward from above upon the upper surface of said starting fuel.

13. As a composition of matter, a fuel for use in a reaction chamber providing both hydrogen gas and heat energy to a mechanical power producing apparatus, said fuel being of two parts including a first starting fuel part hypergolic with water and including lithium hydride, aluminum and magnesium in equal molar relation, a second main fuel part which when elevated above a determined temperature by hypergolic reaction of the starting fuel part with water is itself reactive with water to produce additional hydrogen gas and heat and including a metallic magnesium and aluminum in one-to-two molar relation, said composition of matter further comprising said starting fuel part and said main fuel part in substantially one-to-four weight relation so as to produce both heat energy and a substantially constant rate of hydrogen gas production over time upon the introduction of water to said fuel.

* * * * *

UNITED STATES PATENT AND TRADEMARK OFFICE
CERTIFICATE OF CORRECTION

PATENT NO. : 4,730,601
DATED : March 15, 1988
INVENTOR(S) : NORMAN D. HUBELE and KIM L. JOHNSON It is certified that error appears in the above-identified patent and that said Letters Patent is hereby corrected as shown below:

Column 8, line 9, (claim 2, line 5 thereof) "providing as chamber" should read, -- providing a chamber --;

line 11, (claim 2, line 7 thereof) "chamber main fuel" should read, -- chamber a main fuel --;

lines 21 and 22, (claim 2, lines 16 and 17 thereof) "repsectively" should read, -- respectively --;

line 52, (claim 3, line 22 thereof) "gas to utilizer" should read, -- gas to a utilizer --.

Signed and Sealed this

Nineteenth Day of July, 1988

Attest:

DONALD J. QUIGG

*Attesting Officer*  *Commissioner of Patents and Trademarks*